(12) United States Patent
Kim et al.

(10) Patent No.: US 9,240,580 B2
(45) Date of Patent: Jan. 19, 2016

(54) BATTERY MODULE

(71) Applicants: SAMSUNG SDI CO., LTD., Yongin-si, Gyeonggi-do (KR); ROBERT BOSCH GMBH, Stuttgart (DE)

(72) Inventors: Myung-Chul Kim, Yongin-si (KR); Hee-Joon Jin, Yongin-si (KR); Young-Bin Lim, Yongin-si (KR); Jang-Gun Ahn, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 371 days.

(21) Appl. No.: 13/833,200

(22) Filed: Mar. 15, 2013

(65) Prior Publication Data

US 2013/0316211 A1 Nov. 28, 2013

Related U.S. Application Data

(60) Provisional application No. 61/651,235, filed on May 24, 2012.

(51) Int. Cl.
| | |
|---|---|
| *H01M 2/14* | (2006.01) |
| *H01M 2/10* | (2006.01) |
| *H01M 10/625* | (2014.01) |
| *H01M 10/647* | (2014.01) |
| *H01M 10/6557* | (2014.01) |
| *H01M 10/6555* | (2014.01) |
| *H01M 10/613* | (2014.01) |
| *H01M 10/656* | (2014.01) |

(52) U.S. Cl.
CPC .......... *H01M 2/1077* (2013.01); *H01M 10/613* (2015.04); *H01M 10/625* (2015.04); *H01M 10/647* (2015.04); *H01M 10/6555* (2015.04); *H01M 10/6557* (2015.04); *H01M 10/656* (2015.04); *H01M 2220/20* (2013.01)

(58) Field of Classification Search
CPC .......................... H01M 2/1077; H01M 10/647
See application file for complete search history.

(56) References Cited

U.S. PATENT DOCUMENTS

| | | | |
|---|---|---|---|
| 3,664,877 A | * | 5/1972 | Shaw ............................ 429/99 |
| 6,376,126 B1 | | 4/2002 | Faust et al. |
| 2004/0007374 A1 | | 1/2004 | Higuchi |
| 2006/0049799 A1 | | 3/2006 | Hamada et al. |

(Continued)

FOREIGN PATENT DOCUMENTS

| | | |
|---|---|---|
| EP | 2315293 A1 | 10/2010 |
| JP | 3982352 B2 | 7/2007 |

(Continued)

OTHER PUBLICATIONS

European Search Report in EP 13169061.2-1359, dated Sep. 13, 2013 (Kim, et al.).

*Primary Examiner* — Stewart Fraser
*Assistant Examiner* — Olatunji Godo
(74) *Attorney, Agent, or Firm* — Lee & Morse, P.C.

(57) ABSTRACT

A battery module including a plurality of battery cells; a housing fixing a position of the plurality of battery cells; and a barrier between adjacent ones of the plurality of battery cells, the barrier including a base facing a wide surface of the battery cells, and at least one flange on a periphery of the base, wherein the at least one flange includes at least one flange battery spacer on an inner side thereof and at least one housing spacer on an outer side thereof.

20 Claims, 7 Drawing Sheets

(56) References Cited

U.S. PATENT DOCUMENTS

2010/0104927 A1* 4/2010 Albright .................. 429/50
2011/0052965 A1* 3/2011 Kim et al. ................ 429/156
2011/0097614 A1   4/2011 Kim

FOREIGN PATENT DOCUMENTS

KR    10 2011-0044129 A    4/2011
WO    WO 01/28008 A1       4/2001

* cited by examiner

BATTERY MODULE

CROSS-REFERENCE TO RELATED APPLICATION

The present application claims priority under 35 U.S.C. §119(e) to U.S. Provisional Application No. 61/651,235, filed on May 24, 2012, and entitled: "Battery Module," which is incorporated herein by reference in its entirety.

BACKGROUND

1. Field

Embodiments relate to a battery module.

2. Description of the Related Art

A high-power battery module using a non-aqueous electrolyte with high energy density has recently been developed. The high-power battery module may be configured as a large-capacity battery module manufactured by connecting a plurality of battery cells in series so as to be used in driving motors of devices requiring high power, e.g., electric vehicles or the like.

SUMMARY

Embodiments are directed to a battery module.

The embodiments may be realized by providing a battery module including a plurality of battery cells; a housing fixing a position of the plurality of battery cells; and a barrier between adjacent ones of the plurality of battery cells, the barrier including a base facing a wide surface of the battery cells, and at least one flange on a periphery of the base, wherein the at least one flange includes at least one flange battery spacer on an inner side thereof and at least one housing spacer on an outer side thereof.

The barrier may include a top flange, a bottom flange, and a pair of side flanges connected between the top flange and the bottom flange, the at least one flange battery spacer being on inner sides of the top flange, the bottom flange, and the side flanges.

The top flange, the bottom flange, and the side flanges may each have a plate shape and face narrow surfaces of the battery cells.

The bottom flange may include at least one bottom opening therein, and the side flanges may each include at least one side opening therein.

The at least one flange battery spacer may include a plurality of flange battery spacers, the at least one housing spacer may include a plurality of housing spacers, the at least one bottom opening may include a plurality of bottom openings, and the at least one side opening may include a plurality of side openings.

The plurality of bottom openings may be disposed between the plurality of flange battery spacers on the bottom flange, and the plurality of side openings may be disposed between the plurality of flange battery spacers on the side flanges.

The plurality of housing spacers may be on the outer side of the side flanges and the outer side of the bottom flange.

The housing spacers may extend in pairs in parallel with a plane of the base.

At least one of the side openings may be between a pair of the housing spacers, and at least one of the bottom openings may be between another pair of the housing spacers.

The plurality of housing spacers on the outer side of the side flanges may be spaced apart from one another along a length of the side flanges.

The plurality of housing spacers on the outer side of the side flanges may be further spaced apart from one another along a width direction of the side flanges.

The at least one flange battery spacer may include a rounded contact contacting the battery cells, and a support between the contact and the inner sides of a corresponding one of the bottom flange, the side flanges, and the top flange.

The support may have a width that is about equal to a width of the contact.

The support may have a width that is narrower than a width of the contact.

The support may have a double concave shape.

Each flange battery spacer may extend perpendicularly outwardly from the base to an outer edge of a corresponding one of the bottom flange, the side flanges, and the top flange.

The at least one flange may include at least one opening therein.

The base may include a base battery spacer on a surface thereof, the base battery spacer contacting at least one of the battery cells.

The barrier may be formed of an insulating material.

The housing spacers may space the housing apart from the at least one flange, and the flange battery spacers may space the battery cells apart from the at least one flange.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
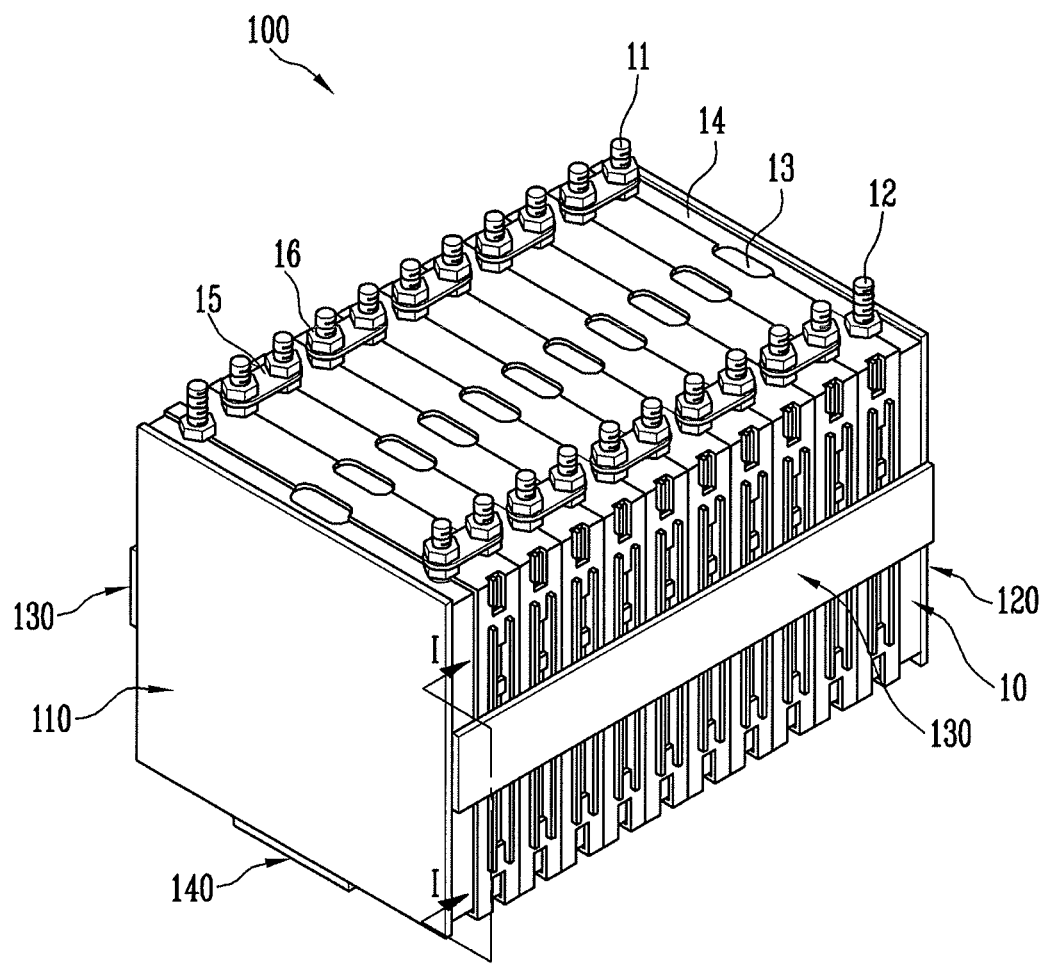
FIG. 1 illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of regions may be exaggerated for clarity of illustration. It will also be understood that when an element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Also, when an element is referred to as being "connected to" another element, it can be directly connected to the another element or be indirectly connected to the another element with one or more intervening elements interposed therebetween.

FIG. 1 illustrates a perspective view of a battery module according to an embodiment.

The battery module 100 according to an embodiment may include a plurality of battery cells 10 (arranged in one direction); barriers 150 (interposed between the respective battery cells 10); and a housing 110, 120, 130 and 140 (accommodating the battery cells 10 and the barriers 150). The barrier 150 may include a base 151 (See FIG. 2) disposed in parallel with wide surfaces of the battery cell 10, and one or more flanges 153, 155, and 157 (See FIG. 2) bent from at least one side of each corner of or on a periphery of the base 151 so as to face a side surface of the battery cell 10. The flanges 153, 155, and 157 may be provided with a plurality of spacers, e.g., a flange battery spacer 160 and a housing spacer 170 (See FIG. 2) respectively protruded from surfaces of at least one of the flanges 153, 155, and 157. In an implementation, at least one end portion of the flange battery spacer 160 may be rounded. The barrier 150 may be formed of an insulating material.

The battery cell 10 may be manufactured by accommodating an electrode assembly (not illustrated) and an electrolyte (not illustrated) in a battery case and then sealing the battery case with a cap assembly 14. The cap assembly 14 may include a positive electrode terminal 11, a negative electrode terminal 12, and a vent 13. The electrode assembly may be electrically connected to the positive and negative electrode terminals 11 and 12, and the positive and negative electrode terminals 11 and 12 may be part of a path along which energy generated by an electrochemical reaction of the electrode assembly and the electrolyte is transferred outside of the battery cell 10. The vent 13 may serve as a path through which gas generated in the inside of the battery cell 10 is exhausted to the outside of the battery cell 10.

The housing 110, 120, 130, and 140 may fix together the plurality of battery cells 10 and the barriers 150 interposed between the respective battery cells 10. The plurality of battery cells 10 may act as one power source. The housing 110, 120, 130 and 140 may include a pair of end plates 110 and 120 (facing wide surfaces of the battery cells 10 at outermost sides of the battery cells 10) and connection members 130 and 140 (connecting the first and second end plates 110 and 120 to each other).

The connection members 130 and 140 may include a pair of side plates 130 and a bottom plate 140. The pair of side plates 130 may support side surfaces of the battery cells 10, and the bottom plate 140 may support bottom surfaces of the battery cells 10. One end of each of the side and bottom plates 130 and 140 may be fastened to the first end plate 110, and another end of each of the side and bottom plate 130 and 140 may be fastened to the second end plate 120. Thus, the side and bottom plates 130 and 140 may connect the first and second end plates 110 and 120 to each other. In an implementation, the fastening may be performed by using, e.g., a bolt and nut or the like.

The first and second end plates 110 and 120 and the connection members 130 and 140 may fix the plurality of battery cells 10. The positive and negative electrode terminals 11 and 12 of neighboring battery cells 10 may be electrically connected to each other by a bus-bar 15. The bus-bar 15 may include holes through which the positive and negative electrode terminals 11 and 12 pass, respectively. The bus-bar 15 (connected to the positive and negative electrode terminals 11 and 12 by respectively passing the positive and negative electrode terminals 11 and 12 through the holes) may be fixed by a nut 16 or the like.

The first and second end plates 110 and 120, the pair of side plates 130, and the bottom plate 140 may stably fix the plurality of battery cells 10 and the barriers 150. In an implementation, a connection structure and number of the battery cells 10 may be variously changed depending on a design of the battery module 100.

Figure 2:
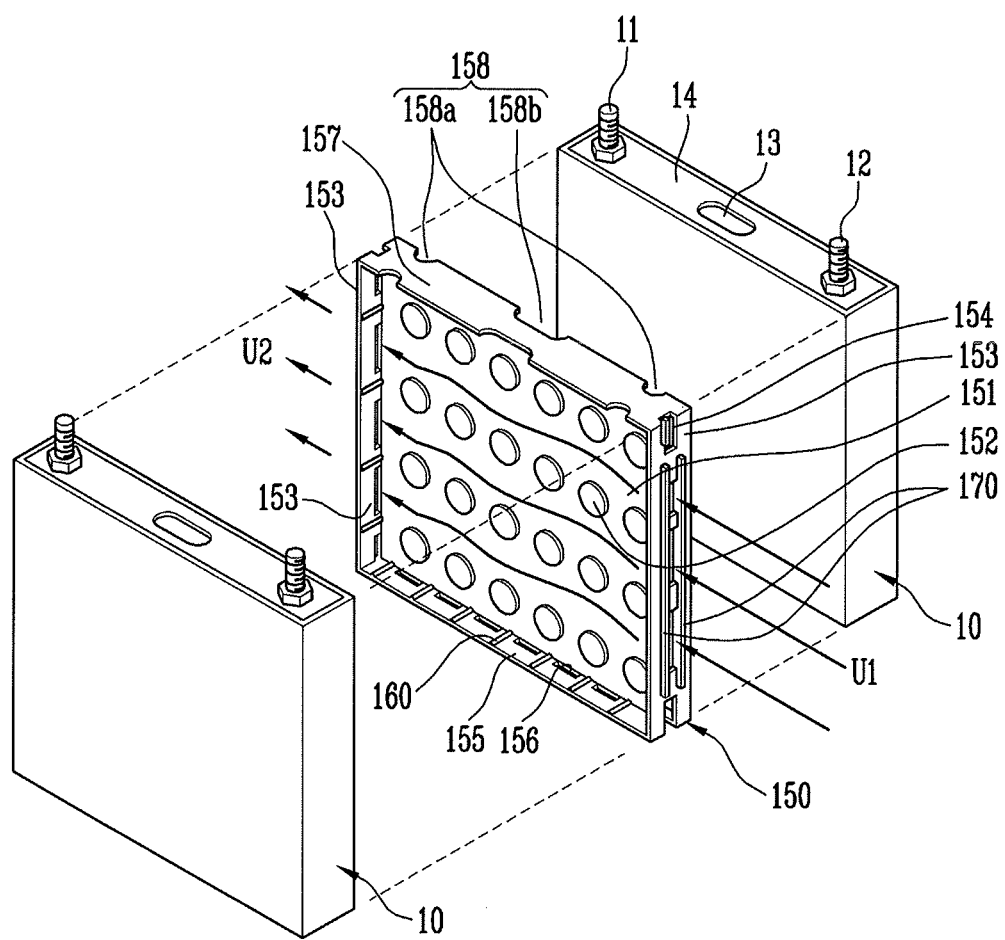
FIG. 2 illustrates an exploded perspective view of a barrier interposed between battery cells of the battery module of FIG. 1.
Figure 3A:
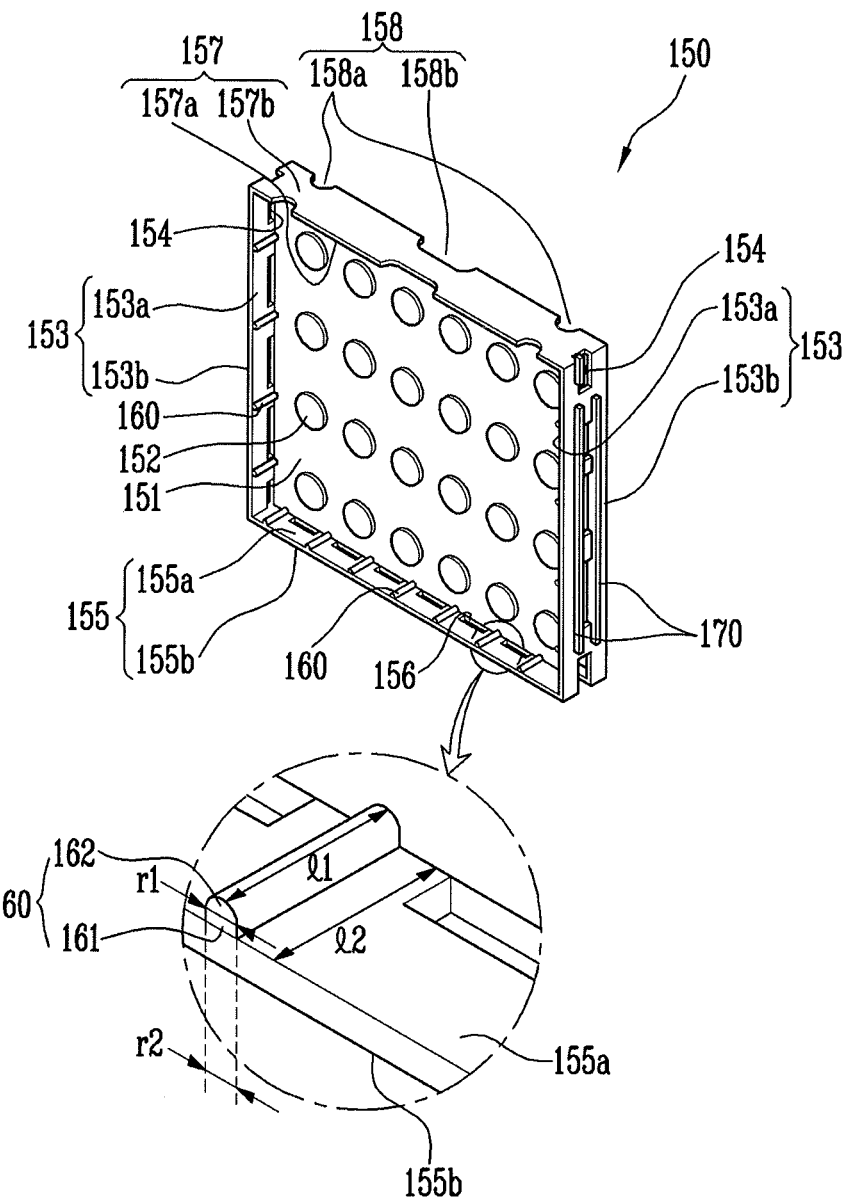
FIG. 3A illustrates a perspective view of the barrier of FIG. 2.
Figure 3B:
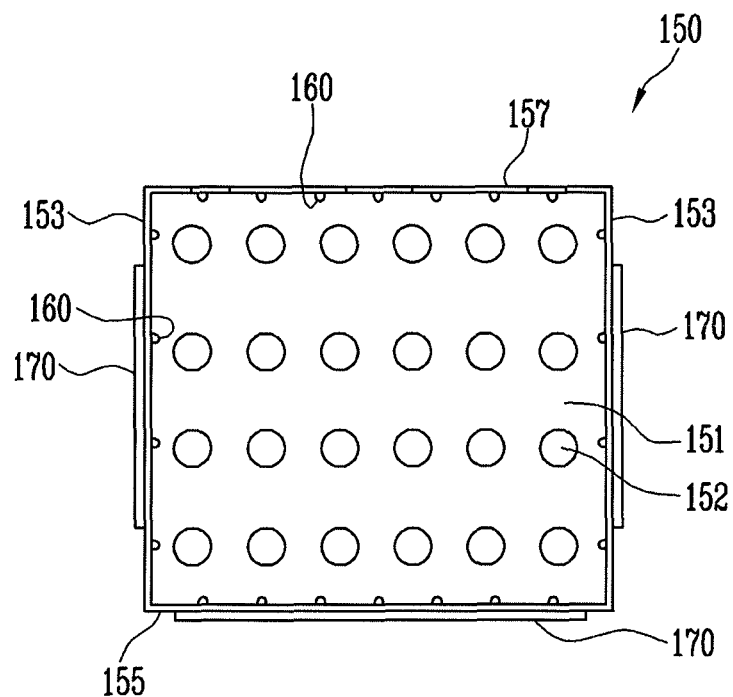
FIG. 3B illustrates a front view of the barrier of FIG. 2.

FIG. 2 illustrates an exploded perspective view of a barrier interposed between battery cells of the battery module of FIG. 1. FIG. 3A is illustrates perspective view of the barrier of FIG. 2. FIG. 3B illustrates a front view of the barrier of FIG. 2.

Referring to FIGS. 2 to 3B, the barrier 150 may include the base 151 (disposed in parallel with wide surfaces of the battery cell 10) and the one or more flanges 153, 155, and 157 provided vertical to each corner of the base 151, e.g., on a periphery of the base 151. A plurality of spacers, e.g., the flange battery spacers 160 having a rounded end portion and housing spacers 170, may be provided on the flanges 153, 155, and 157. The spacers 160 and 170 may space apart the battery cell 10 and the barrier 150, and the barrier 150 and the housing 110, 120, 130, and 140 from each other. For example, the flange battery spacers 160 may space the battery cells 10 apart from at least one of the flanges 153, 155, and 157, and the housing spacers 170 may space the housing 110, 120, 130, and 140 apart from at least one of the flanges 153, 155, and 157.

The base 151 may have a shape corresponding to the wide surfaces of the battery cell 10. The base 151 may include at least one base battery spacer 152 protruded from a surface of the base 151 so as to space apart the base 151 and the battery cell 10 from each other, e.g., the base battery spacer 152 may contact the battery cell 10. In an implementation, the plurality of base battery spacers 151 may be spaced apart from one another.

In an implementation, the flanges 153, 155 and 157 may all be provided at both side portions and top and bottom portions of the base 151, e.g., around the periphery of the base 151. The flanges 153, 155, and 157 may be connected vertical to the base 151 at the corners of the base 151. In an implementation, the base 151 may be connected to a central portion of the flanges 153, 155 and 157. The flanges 153, 155, and 157 may include rectangular flat plates respectively provided to face the side surfaces of the battery cell 10. For example, the flanges 153, 155, and 157 may include a pair of side flanges 153 (respectively provided at the sides of the base 151), a bottom flange 155 (provided at the bottom of the base 151), and a top flange 157 (provided at the top of the base portion 151).

One or more openings 154 and 156 (acting as a path of a heat exchange medium) may be provided to the side and/or bottom flanges 153 and/or 155. For example, the bottom flange 153 may include at least one bottom opening 156 therein, and the side flanges 155 may each include at least one side opening 154 therein. The openings 154 and 156 may include a plurality of holes spaced apart from one another along a length direction of the side and/or bottom flanges 153 and/or 155. The openings 154 and 156 may be provided at a central portion of the side or bottom flanges 153 or 155. Thus, the openings 154 and 156 may all communicate with one another on sides of the base 151. The openings 154 and 156 may be spaced apart from one another. Thus, the base 151 may be connected to the central portion of the side or bottom flanges 153 or 155.

The battery module 100 may include the plurality of battery cells 10, and the battery cells 10 may generate heat while repeating charging/discharging thereof. The heat may promote deterioration of the battery cell and may cause a fire or explosion of the battery cells 10 (in an extreme case). Thus, the heat should be removed. In an implementation, the openings 154 and 156 (provided to the side or bottom flange portion 153 or 155 of the barrier 150) may act as a path U1 to U2 of the heat exchange medium. The heat exchange medium may flow in the barrier 150 through the openings 154 and 156 and may exchange heat with the battery cells 10 by passing between the base battery spacers 152 of the base 151 and directly facing the wide surface of the battery cell 10. Thus, a lifetime of the battery module 100 may be extended by effectively controlling the temperature of the battery cell 10.

The bottom flange 155 may connect bottoms of the two side flanges 153 to each other, and may have a width similar or identical to that of the side flanges 153. The top flange 157 may connect the tops of the two side flanges 153 to each other, and may have a shape corresponding to the cap assembly 14 of the battery cell 10. For example, the cap assembly 14 of the battery cell 10 may be provided with the positive electrode terminal 11, the negative electrode terminal 12, and the vent 13. One or more concave portions 158 may be provided at an edge of the top flange 157 so that the positive electrode terminal 11, the negative electrode terminal 12, and the vent 13 may be exposed therethrough. The concave portion 158 may include a first concave portion 158a (having a shape corresponding to an approximately half of the bottom section of the positive or negative electrode terminal 11 or 12), and a second concave portion 158b (having a shape corresponding to an approximately half of the section of the vent 13). The top flanges 157 of neighboring barriers 150 interposed between the battery cells 10 may be adjacent to each other. Thus, the first concave portions 158a of the adjacent top flanges 157 may expose the positive or negative electrode terminal 11 or 12, and the second concave portions 158b of the adjacent top flanges 157 may expose the vent 13.

Inner surfaces or inner sides of the side, bottom, and top flanges 153, 155, and 157 contacting the battery cell 10 may be referred to as first surfaces or inner sides 153a, 155a, and 157a, respectively. Surfaces or sides opposite to the first sides 153a, 155a, and 157a may be referred to as second surfaces or outer sides 153b, 155b, and 157b, respectively. In this case, the spacers 160 and 170 may include the flange battery spacers 160 provided to any one of the inner sides 153a, 155a and 157a of the side, bottom, and top flanges 153, 155, and 157, and the housing spacers 170 provided to any one of the outer sides 153b, 155b, and 157b of the side, bottom, and top flanges 153, 155, and 157.

The flange battery spacers 160 may be provided between the battery cell 10 and the flanges 153, 155, and 157 so as to fix the battery cell 10. The flange battery spacers 160 may be provided so that rounded end portions of the flange battery spacers 160 contact the battery cell 10. The flange battery spacers 160 may include a support 161 protruded from the flange 153, 155, or 157, and a rounded contact 162 on the support 161 and contacting the battery cell 10. For example, a diameter or width r2 of the support 161 may correspond to a diameter or width r1 of the contact 162. The flange battery spacers 160 may be on the inner sides 153a, 155a, and 157a of the flanges 153, 155, and 157, and may be provided at a portion except the portion provided with the side opening 154 so that the flange battery spacers 160 and the side opening 154 do not interfere with each other. A length l1 of the flange battery spacers 160 may correspond to a width l2 of the inner sides 153a, 155a, and 157a of the flanges 153, 155, and 157. For example, each flange battery spacer 160 may extend perpendicularly outwardly from the base 151 to an outer edge of a corresponding one of the flanges 153, 155, and 157. A plurality of flange battery spacers 160 may be spaced apart from one another at a predetermined interval. For example, the side opening 154 and the flange battery spacers 160 may be alternately provided.

In an implementation, the housing spacers 170 may be provided in parallel with each other in a length direction of the side or bottom flanges 153 or 155 on the outer sides 153b or 155b of the side or bottom flanges 153 or 155, and may be provided adjacent to the openings 154 and 156 of the side or bottom flanges 153 or 155. The housing spacers 170 may be provided with a pair of bar-shaped spacing members formed with the openings 154 and 156 interposed therebetween on each of the side and bottom flanges 153 and 155. For example, the housing spacers 170 may extend in pairs in parallel with a plane of the base 151. In an implementation, at least one of the side openings 154 may be between a pair of the housing spacers 170, and at least one of the bottom openings 156 may be between another pair of the housing spacers 170. In an implementation, a plurality of the housing spacers 170 on the outer side 153b of the side flanges 153 may be spaced apart from one another along a length of the side flanges 153. In addition, in an implementation, a plurality of the housing spacers 170 on the outer side 153b of the side flanges 153 may be further spaced apart from one another along a width direction of the side flanges 153.

Figure 4:
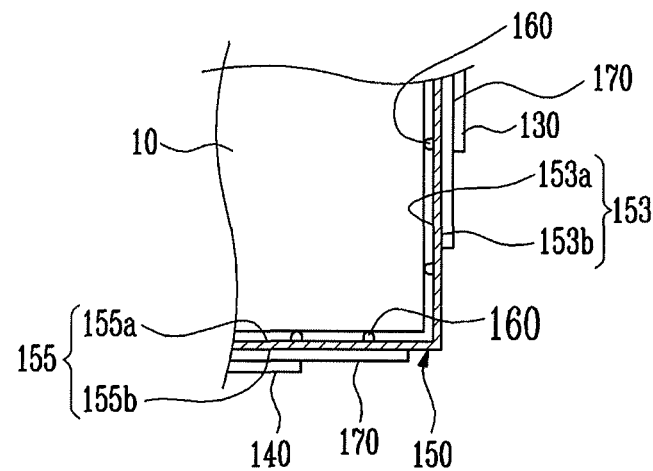
FIG. 4 illustrates a sectional view taken along line I-I of FIG. 1.

FIG. 4 illustrates a sectional view taken along line I-I of FIG. 1.

Referring to FIG. 4, the battery cell 10 may be spaced apart from the inner sides 153a and 155a of the side and bottom flanges 153 and 155 of the barrier 150 by the flange battery spacers 160. The connection members 130 and 140 may be spaced apart from the outer sides 153b and 155b of the side and bottom flanges 153 and 155 by the housing spacers 170.

The heat exchange medium exchanging heat with the battery cell 10 may include, e.g., cooling water or cooled air. When the battery cell 10 is cooled under a very humid environment, condensed water may form on surfaces of the battery cell 10 due to cooling of the moisture. The housing 110, 120, 130, 140 fixing the battery cell 10 and outer surfaces of the battery cell 10 may be made of, e.g., stainless steel. Thus, the battery cell 10 and the housing 110, 120, 130, 140 may be electrically connected to each other by the condensed water, possibly causing an undesirable short circuit.

In the battery module 100 according to the present embodiment, the spacers 152, 160, and 170 may be provided between the battery cell 10 and the barrier 150 and between the barrier 150 and the housing 110, 120, 130, 140. Accordingly, it is possible to prevent the battery cell 10 and the housing 110, 120, 130, 140 from being electrically connected to each other by the condensed water. Further, one or more base battery spacers 152 may be provided to the barrier 150 to surround the battery cell 10, and the spacers 152, 160, and 170 may space apart the battery cell 10, the barrier 150, and the housing 110, 120, 130, 140 from one another. Thus, even if condensed water were to be formed on the surface of the battery cell 10, the condensed water may be discharged into the space formed by spacing apart the battery cell 10 and the barrier 150 from each other. An end portion of the flange battery spacers 160 between the battery cells 10 and the barrier 150 may be rounded. Thus, the flange battery spacers 160 may contact the battery cell 10 at only a narrow area, and the condensed water may be easily discharged along the rounded outer surfaces of the flange battery spacers 160.

Hereinafter, other embodiments will be described with reference to FIGS. 5 to 8. These embodiments may be similar to the previous embodiment. Therefore, repeated detailed descriptions of like or similar elements may be omitted.

Figure 5:
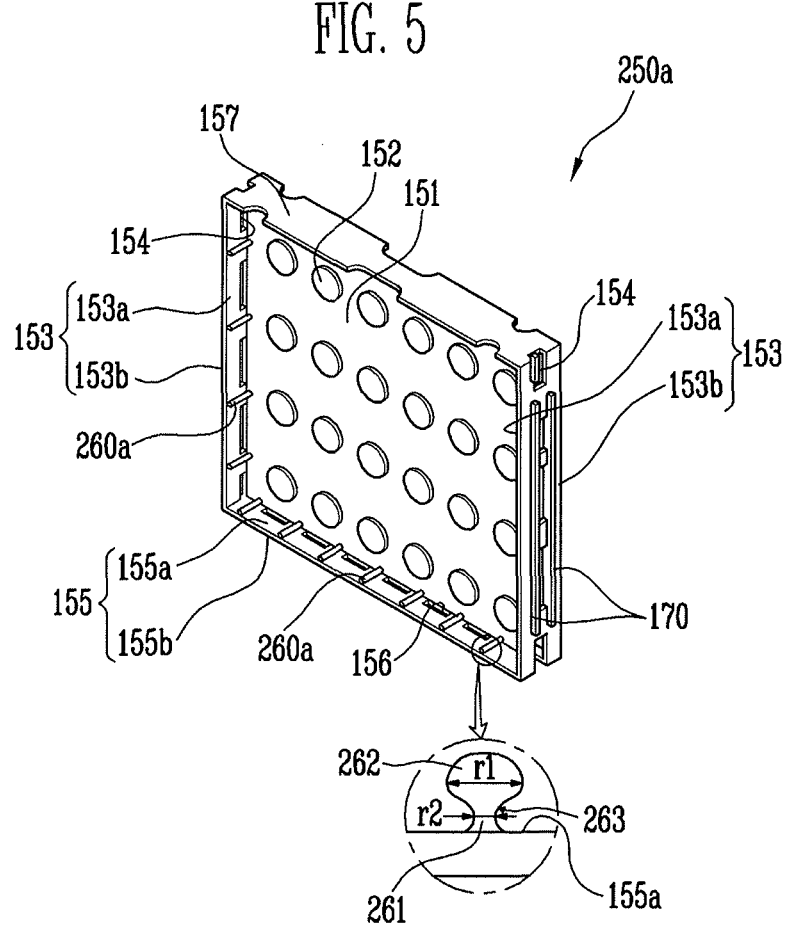
FIG. 5 illustrates a perspective view of a barrier according an embodiment.
Figure 6:
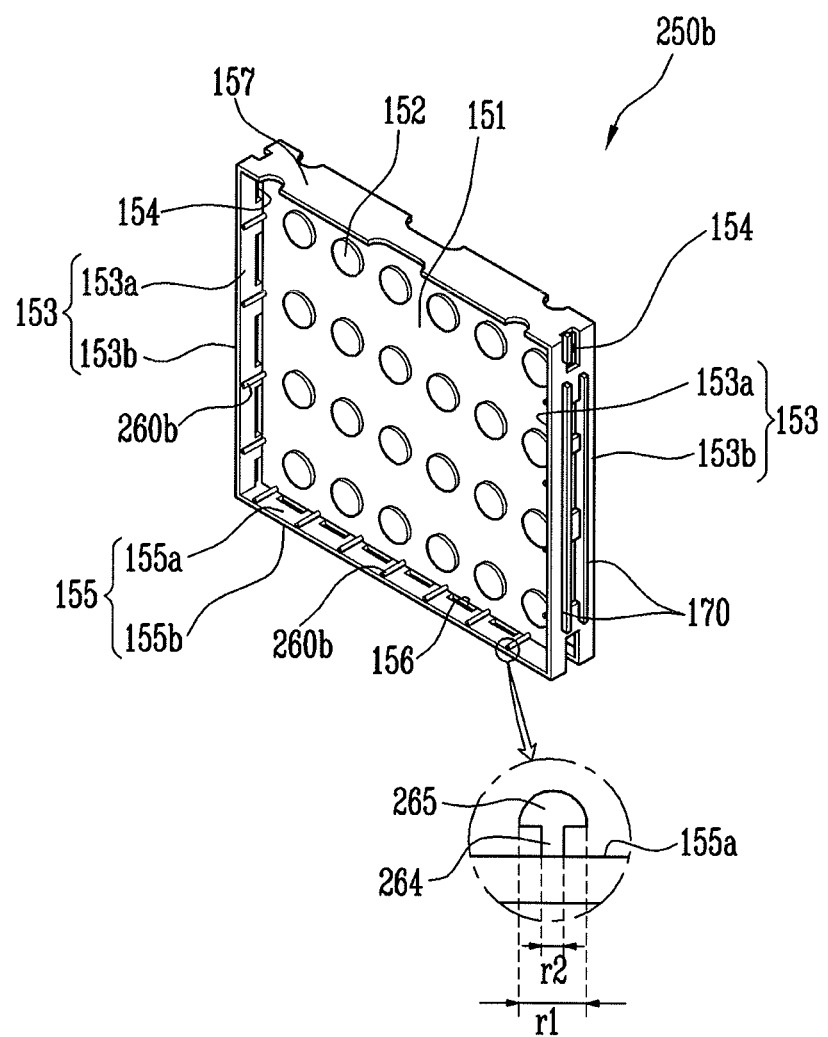
FIG. 6 illustrates a perspective view of a barrier according an embodiment.

FIG. 5 illustrates a perspective view of a barrier according to an embodiment. FIG. 6 illustrates a perspective view of a barrier according an embodiment.

Referring to FIGS. 5 and 6, the barrier 250a or 250b may include a base 151 and at least one flange 153, 155, and 157. A flange battery spacer 260a or 260b may be provided on inner sides 153a and 155a of one or more flanges 153, 155, and 157, and housing spacers 170 may be provided on outer sides 153b and 155b of the one or more flanges 153, 155, and 157. The flange battery spacers 260a or 260b may include a support 261 or 264 protruded from the at least one flange 153, 155 or 157, and a rounded contact 262 or 265 on the support 261 or 264. For example, a width r2 of the support 261 or 264 may be smaller than a diameter or width r1 of the rounded contact 262 and 265. The flange battery spacers 260a or 260b may be alternately provided with the openings 154 and 156 on side and bottom flanges 153 and 155.

For example, in the flange battery spacers 260a of the barrier 250a of FIG. 5, the support 261 may have a double concave shape, and a portion 263 of the rounded contact 262, contacting the support 261, may be rounded. For example, an end of the rounded contact 262 may be smoothly connected to the support 261. In the flange battery spacers 260b of the barrier 250b of FIG. 6, the support 264 may have a bar shape, and a portion of the rounded contact 265, contacting the support 264, may be provided in parallel with the inner side 155a of the flange.

In the barrier 250a or 250b of FIG. 5 or 6, a width r2 of the support 261 or 264 in the flange battery spacers 260a or 260b may be smaller than a diameter or width r1 of the rounded contact 262 or 265. Therefore, condensed water formed on the surface of the battery cell 10 may flow to the bottom of the rounded contact 262 or 265 along the surface of the rounded contact 262 or 265. In this case, the support 261 or 264 may have an area smaller than that of the rounded contact 262 or 265, and thus the condensed water may be effectively discharged to the outside of the barrier 250a or 250b.

Figure 7:
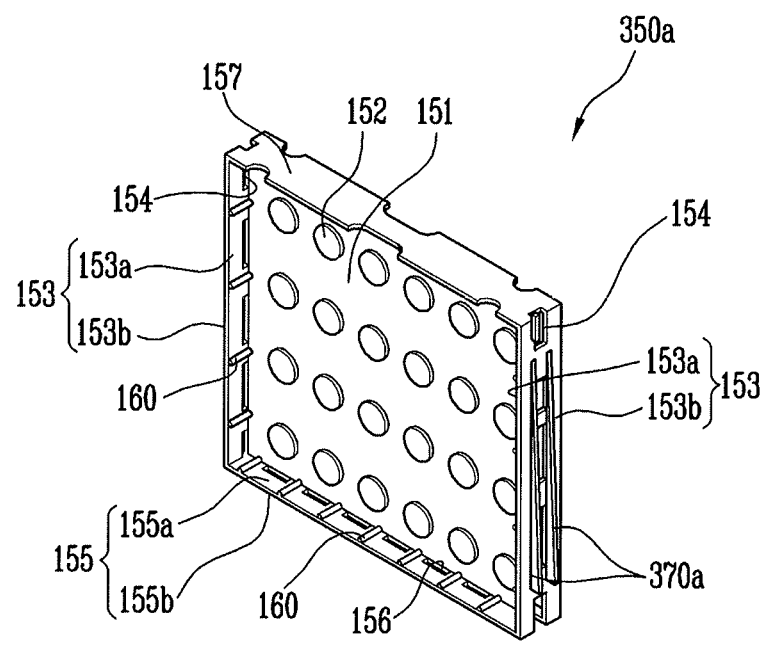
FIG. 7 illustrates a perspective view of a barrier according an embodiment.
Figure 8:
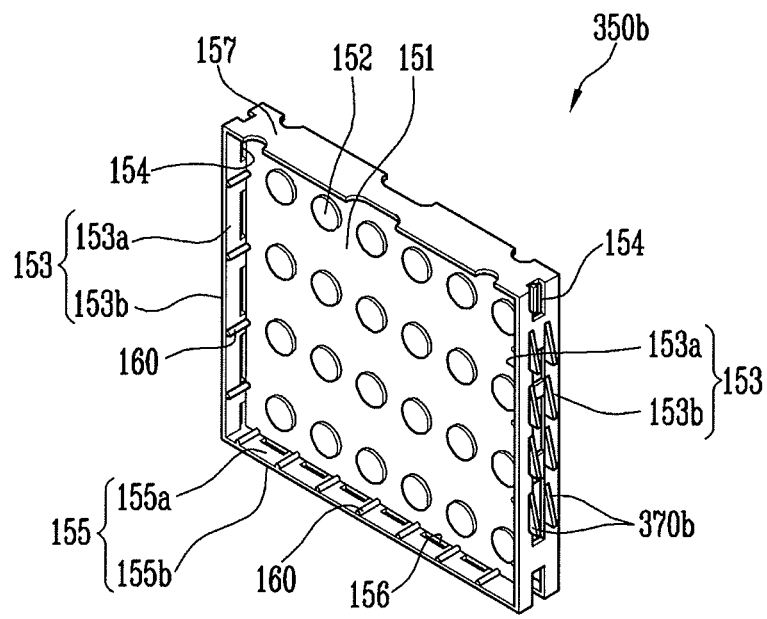
FIG. 8 illustrates a perspective view of a barrier according an embodiment.

FIG. 7 illustrates a perspective view of a barrier according to an embodiment. FIG. 8 illustrates a perspective view of a barrier according to an embodiment.

Referring to FIGS. 7 and 8, the barrier 350a or 350b may include a base 151, at least one flange 153, 155, and 157, a flange battery spacer 160 on inner sides 153a or 155a of the at least one flange 153, 155, and 157, and housing spacers 370a or 370b on outer sides 153b or 155b of the at least one flange 153, 155, and 157. At least one portion of the housing spacer 370a or 370b may be inclined to have a lower portion wider than an upper portion thereof. The housing spacer 370a or 370b may be provided on the side and bottom flanges 153 and 155, i.e., not on the top flange 157. In an implementation, the section of the housing spacer 370a or 370b on the side flange 153 may have a triangular shape.

For example, the housing spacer 370a on the barrier 350a of FIG. 7 may be adjacent to the side opening 154 in the side flange 153, and a pair of housing spacers 370a may be provided in parallel, with the side opening 154 interposed therebetween. The housing spacers 370b on the barrier 350b of FIG. 8 may include a plurality of housing spacers 370b, and the plurality of housing spacers 370b may be spaced apart from one another in the width or length direction of the side flange 153.

The housing spacers 370a or 370b may space apart the barrier 350a and 350b and the housing (see FIG. 1) from each other. Condensed water formed on a surface of the housing may not penetrate into the barrier 350a and 350b, but rather may drop to a bottom of the barrier 350a and 350b. Housing spacers on the bottom flange 155 may have a bar shape so as to support a weight of the battery cell 10 and to maintain balance. The bottom flange 155 may be adjacent to a bottom portion of the housing. Thus, the condensed water may easily drop. In addition, the condensed water may flow along the side flange 153. In this case, the housing spacers 370a or 370b on the side flange 153 may be inclined, and thus the condensed water may be easily dropped and discharged.

By way of summation and review, an electrochemical reaction occurs in a battery cell, and electrical energy generated by the electrochemical reaction may be transferred to the outside of the battery cell through positive and negative electrode terminals. A case for fixing the battery cell may be made of metal. Thus, there may be a risk of an electrical short circuit between the case and the battery cell. Therefore, the battery cell may be insulated from the case. In a battery module including a plurality of battery cells, the insulation of the battery cells may be broken in a process of fixing the battery cells, which may raise safety concerns in the battery module.

The embodiments provide a battery module having improved electrical safety.

The embodiments also provide a battery module capable of preventing battery cells from being electrically connected to one another by using a barrier.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
    a plurality of battery cells;
    a housing fixing a position of the plurality of battery cells; and
    a barrier between adjacent ones of the plurality of battery cells, the barrier including:
        a base facing wide surfaces of the adjacent ones of the plurality of battery cells, and
        at least one flange on a periphery of the base and facing narrow surfaces of the adjacent ones of the plurality of battery cells,
        at least one flange battery spacer on an inner side of the flange, and
        at least one housing spacer on an outer side of the flange.

2. The battery module as claimed in claim 1, wherein the barrier includes a top flange, a bottom flange, and a pair of side flanges connected between the top flange and the bottom flange, the at least one flange battery spacer being on inner sides of the top flange, the bottom flange, and the side flanges.

3. The battery module as claimed in claim 2, wherein the top flange, the bottom flange, and the side flanges each have a plate shape and face the narrow surfaces of the adjacent ones of the plurality of battery cells.

4. The battery module as claimed in claim 2, wherein:
the bottom flange includes at least one bottom opening therein, and
the side flanges each include at least one side opening therein.

5. The battery module as claimed in claim 4, wherein the battery module includes:
a plurality of the flange battery spacers,
a plurality of the housing spacers,
a plurality of the bottom openings, and
a plurality of the side openings.

6. The battery module as claimed in claim 5, wherein:
the plurality of bottom openings are disposed between the plurality of flange battery spacers on the bottom flange, and
the plurality of side openings are disposed between the plurality of flange battery spacers on the side flanges.

7. The battery module as claimed in claim 5, wherein the plurality of housing spacers are on the outer side of the side flanges and the outer side of the bottom flange.

8. The battery module as claimed in claim 5, wherein the housing spacers extend in pairs in parallel with a plane of the base.

9. The battery module as claimed in claim 5, wherein:
at least one of the side openings is between a pair of the housing spacers, and
at least one of the bottom openings is between another pair of the housing spacers.

10. The battery module as claimed in claim 5, wherein the plurality of housing spacers on the outer side of the side flanges are spaced apart from one another along a length of the side flanges.

11. The battery module as claimed in claim 10, wherein the plurality of housing spacers on the outer side of the side flanges are further spaced apart from one another along a width direction of the side flanges.

12. The battery module as claimed in claim 2, wherein the at least one flange battery spacer includes:
a rounded contact contacting the battery cells, and
a support between the contact and the inner sides of a corresponding one of the bottom flange, the side flanges, and the top flange.

13. The battery module as claimed in claim 12, wherein the support has a width that is about equal to a width of the contact.

14. The battery module as claimed in claim 12, wherein the support has a width that is narrower than a width of the contact.

15. The battery module as claimed in claim 14, wherein the support has a double concave shape.

16. The battery module as claimed in claim 2, wherein each flange battery spacer extends perpendicularly outwardly from the base to an outer edge of a corresponding one of the bottom flange, the side flanges, and the top flange.

17. The battery module as claimed in claim 1, wherein the at least one flange includes at least one opening therein.

18. The battery module as claimed in claim 1, wherein the base includes a base battery spacer on a surface thereof, the base battery spacer contacting at least one of the battery cells.

19. The battery module as claimed in claim 1, wherein the barrier is formed of an insulating material.

20. The battery module as claimed in claim 1, wherein:
the at least one housing spacer spaces the housing apart from the at least one flange, and
the at least one flange battery spacer spaces the battery cells apart from the at least one flange.

* * * * *